United States Patent
Lopez De Arroyabe

(10) Patent No.: US 9,908,418 B2
(45) Date of Patent: Mar. 6, 2018

(54) CIRCUIT ARRANGEMENT AND ENERGY STORAGE SYSTEM

(71) Applicant: Bayerische Motoren Werke Aktiengesellschaft, Munich (DE)

(72) Inventor: Jose Lopez De Arroyabe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 218 days.

(21) Appl. No.: 14/883,920

(22) Filed: Oct. 15, 2015

(65) Prior Publication Data

US 2016/0031329 A1 Feb. 4, 2016

Related U.S. Application Data

(63) Continuation of application No. PCT/EP2014/059511, filed on May 9, 2014.

(30) Foreign Application Priority Data

Jun. 20, 2013 (DE) .................. 10 2013 211 692

(51) Int. Cl.
*B60L 1/00* (2006.01)
*B60L 11/18* (2006.01)
(Continued)

(52) U.S. Cl.
CPC .............. *B60L 11/18* (2013.01); *H02H 3/087* (2013.01); *H02H 3/10* (2013.01)

(58) Field of Classification Search
CPC ............ H02H 3/087; H02H 3/10; B60L 11/18
(Continued)

(56) References Cited

U.S. PATENT DOCUMENTS 4,575,673 A * 3/1986 Tedeschi ................ H02H 3/087
307/10.1
6,555,935 B1 * 4/2003 Maskovyak ..... H03K 17/04123
307/117
(Continued)

FOREIGN PATENT DOCUMENTS

DE 41 36 240 A1 5/1993
DE 10 2011 010 230 A1 8/2012
(Continued)

OTHER PUBLICATIONS

International Search Report (PCT/ISA/210) issued in PCT Application No. PCT/EP2014/059511 dated Jun. 27, 2014, with English translation (four (4) pages).

(Continued)

*Primary Examiner* — Thomas Skibinski
(74) *Attorney, Agent, or Firm* — Crowell & Moring LLP

(57) ABSTRACT

A circuit arrangement for operating an energy store of an electric and/or hybrid vehicle includes an analog monitoring circuit. The analog monitoring circuit is designed and arranged to detect a measurement signal that is representative of a current flowing through the energy store, and to generate a predetermined first control signal in a manner dependent on the measurement signal. The circuit arrangement further has a semiconductor switching element which is designed to electrically couple, in a first switching state, the energy store to an electrical energy network, and, in a second switching state, to electrically decouple the energy store from the electrical energy network. The semiconductor switching element includes a control terminal which is coupled by signaling technology to an output of the monitoring circuit. The switching state of the semiconductor switching element is adjustable in a manner dependent on the first control signal.

20 Claims, 2 Drawing Sheets

(51) Int. Cl.
*H02H 3/087* (2006.01)
*H02H 3/10* (2006.01)

(58) Field of Classification Search
USPC ........... 307/10.1, 9.1, 10.2, 10.3, 10.6, 10.7, 307/10.8; 320/103, 107, 109, 110
See application file for complete search history.

(56) References Cited

U.S. PATENT DOCUMENTS

| | | | |
|---|---|---|---|
| 2009/0066291 | A1 | 3/2009 | Tien et al. |
| 2010/0194398 | A1* | 8/2010 | Kawasumi .............. H01M 2/34 324/430 |
| 2012/0150393 | A1 | 6/2012 | Knight-Newbury et al. |
| 2012/0293017 | A1 | 11/2012 | Lidsky et al. |
| 2014/0120389 | A1 | 5/2014 | Fink |

FOREIGN PATENT DOCUMENTS

| | | |
|---|---|---|
| DE | 10 2011 077 311 A1 | 12/2012 |
| EP | 0 926 796 A2 | 6/1999 |
| EP | 2 403 105 A2 | 1/2012 |
| EP | 2 181 481 B1 | 10/2013 |

OTHER PUBLICATIONS

German Search Report issued in counterpart German Application No. 10 2013 211 692.6 dated Mar. 7, 2014, with partial English translation (ten (10) pages).

* cited by examiner

CIRCUIT ARRANGEMENT AND ENERGY STORAGE SYSTEM

CROSS REFERENCE TO RELATED APPLICATIONS

This application is a continuation of PCT International Application No. PCT/EP2014/059511, filed May 9, 2014, which claims priority under 35 U.S.C. § 119 from German Patent Application No. 10 2013 211 692.6, filed Jun. 20, 2013, the entire disclosures of which are herein expressly incorporated by reference.

BACKGROUND AND SUMMARY OF THE INVENTION

The invention relates to a circuit arrangement for operating an energy storage system of an electric and/or hybrid vehicle, as well as to an energy storage system.

In automotive engineering, it is known to use high-voltage batteries that provide the current needed to drive an electric motor in an electric and/or hybrid vehicle. In motorized operation of the electric and/or hybrid vehicle, electric energy can be transferred from the so-called traction battery to the electric motor via a so-called traction network. In a generator operation (recuperation operation), the electric energy can be transferred from the electric motor to the traction battery via the traction network. For safety reasons, the traction battery must be electrically separable from the traction network and from electric or electronic elements composing the traction network. For this purpose, there generally are so-called breakers or circuit breakers arranged between connection points of the traction battery and connection points of the traction network.

The present invention addresses the problem of providing a circuit arrangement for operating an energy storage system of an electric and/or hybrid vehicle, and an energy storage system, which enable a sufficiently reliable electric isolation of an energy store from an electric energy network of an electric and/or hybrid vehicle.

The problem is solved according to a first aspect of the invention by a circuit arrangement for operating an energy storage system of an electric and/or hybrid vehicle. The circuit arrangement includes an analog monitoring circuit, which is designed and arranged to detect a measurement signal that is representative of a current flowing through the energy store, and to generate a predetermined first control signal in a manner dependent on the measurement signal. The circuit arrangement further includes a semiconductor switching element which is designed to electrically couple, in a first switching state, the energy store to an electrical energy network, and, in a second switching state, to electrically decouple the energy store from the electrical energy network, wherein the semiconductor switching element comprises a control terminal which is coupled by signaling technology to an output of the monitoring circuit, and the switching state of the semiconductor switching element is adjustable in a manner dependent on the first control signal.

Advantageously, this makes it possible to limit, to a predetermined value, a maximum current flowing through the energy store. This is particularly advantageous in that a warranty limit and, accordingly, a manufacture specification for the maximum current flowing through the energy store and, in particular, through cells of the energy store is not exceeded. Warranty costs can thereby be reduced, and a contribution can be made to reducing environmental pollution, because the respective energy store can have a longer life. The satisfaction of a user of the vehicle can also be enhanced, because the likelihood that the energy store must be replaced due to the exceeding of the maximum current can be kept low. The decoupling of the energy store from the energy network can be done very quickly, because of an extremely short response time of the monitoring circuit, such that lines of the energy network can be laid for a lower short-circuit current and demands in terms of a short-circuit strength of the lines and/or connectors are reduced. This makes it possible to pare down further production costs for the electric and/or hybrid vehicle. Advantageously, the quick response time of the analog monitoring circuit makes it possible to detect the short-circuit and/or overcurrent so quickly, and isolate the energy store from the energy network so quickly, that an additional protective fuse can be forgone. The semiconductor switching element is advantageous in that very little space is required and in that capacity that needs to be provided to control the semiconductor switching element can be kept very low.

The energy network may include a load, and in particular an electric motor for driving the electric and/or hybrid vehicle with associated power electronics. The circuit arrangement may preferably have one or two semiconductor switching elements, whereby a unipolar or bipolar isolation of the energy store from the energy network is possible. Preferably, the energy store is a high-voltage energy store. A high-voltage energy store designates here an energy store that operates a drive train. In an advantageous embodiment of the first aspect, the circuit arrangement includes a digital control device. The digital control device is designed to generate a predetermined second control signal in a manner dependent on at least one predetermined energy store-related operational quantity, at least one predetermined vehicle-related environmental quantity, at least one predetermined vehicle-related operational quantity, and/or at least one predetermined energy network-related operational quantity. The second control signal is output at a predetermined interface that is coupled by signaling technology to the control terminal of the semiconductor switching element. The switching state of the semiconductor switching element is adjustable in a manner dependent on the second control signal. This is advantageous in that the energy store can be isolated from the energy network or electrically coupled to the energy network in a manner dependent on other quantities.

In another advantageous embodiment, a predetermined course of the first control signal is representative of a request for the semiconductor switching element to occupy the second switching state. Additionally, a predetermined course of the second control signal is representative of a request for the semiconductor switching element to occupy the second switching state. If the first control signal or the second control signal—or both control signals—has the respective predetermined course, then the control terminal of the semiconductor switching element is controlled such that the semiconductor switching element occupies the second switching state. This is advantageous in that regardless of whether a short-circuit and/or overcurrent is detected from the analog monitoring circuit or from the control device, the energy store is isolated from the energy network. This independence may be advantageously used for the functional safety in the vehicle.

In another advantageous embodiment of the first aspect, a predetermined further course of the second control signal is representative of a request for the semiconductor switching element to occupy the first switching state. If the second control signal includes the predetermined further course and the first control signal does not comprise the predetermined course, then the control terminal of the semiconductor switching element is controlled such that the semiconductor switching element occupies the first switching state. This is advantageous in that if a short-circuit current or overcurrent is not detected, then the energy store can be electrically coupled to the energy network in a manner dependent on the additional quantities.

In a further advantageous embodiment according to the first aspect, the semiconductor switching element has at least one field effect transistor. Advantageously, the field effect transistors that are designed so as to be suitable for such usage have a much higher switching speed than mechanical relays, protective circuits, or fuses, so that the energy store can be much more rapidly isolated from the energy network than with mechanical relays, protective circuits, or fuses.

In another advantageous embodiment according to the first aspect, the semiconductor switching element includes at least one field effect transistor and at least one second field effect transistor, wherein each at least one second field effect transistor is respectively connected in anti-series to the at least one first field effect transistor. Such a circuit is also known as a back-to-back arrangement. This is advantageous in that the semiconductor switching element is suitable for both current directions as a switching element that may have the first and second switching state. Preferably, the semiconductor switching element has a plurality of such transistor pairs, which are connected in parallel. This is advantageous in that the transistors can have a lower maximum current resistance.

In another advantageous embodiment according to the first aspect, the circuit arrangement includes a decoupling circuit module having a galvanic decoupling element, an output, and at least one input. The output is electrically coupled to the semiconductor switching element. The input is electrically coupled to the monitoring circuit and/or to the control device for receiving the first control signal or the second control signal. The galvanic decoupling element galvanically decouples the output and the at least one input, and, in a potential-free manner, connects the output and the at least one input. This is advantageous in that the semiconductor switching element is galvanically isolated from the analog monitoring circuit and/or from the control device.

In a further advantageous embodiment according to the first aspect, the galvanic decoupling element includes an optical transmission element and an optical receiver element. Advantageously, this enables simple and cost-effective production of the decoupling element.

In another advantageous embodiment according to the first aspect, the analog monitoring circuit includes a current sensor and an analog comparator, wherein the analog comparator is designed and arranged so as to generate the first control signal in a manner dependent on a comparison of a predetermined threshold value with a measurement value that is detected by the current sensor and is representative of a current that flows through the energy store. Advantageously, this makes it possible to very precisely and rapidly detect a short-circuit current and/or an overcurrent flowing through the energy store.

The invention features an energy storage system, according to a second aspect. The energy storage system comprises an energy store and a circuit arrangement according to the first aspect. Advantageous embodiments of the first aspect hereby apply also to the second aspect.

The circuit arrangement is preferably designed such that a cumulative time composed of a responsive time of the analog monitoring circuit, plus a switching time of the semiconductor switching element from the first switching state to the second switching state, plus a signal delay time of the first control signal from the output of the analog monitoring circuit to the control terminal, is shorter than a predetermined maximum current rise time and a predetermined inductance of the energy network if the energy network has an ohmic short-circuit. The maximum current rise time is predetermined by a predetermined maximum current that is allowed to flow through the energy store without destroying same.

Other objects, advantages and novel features of the present invention will become apparent from the following detailed description of one or more preferred embodiments when considered in conjunction with the accompanying drawings.

Elements of identical construction or function are provided with the same reference signs throughout the drawings.

DETAILED DESCRIPTION OF THE DRAWINGS

Figure 1:
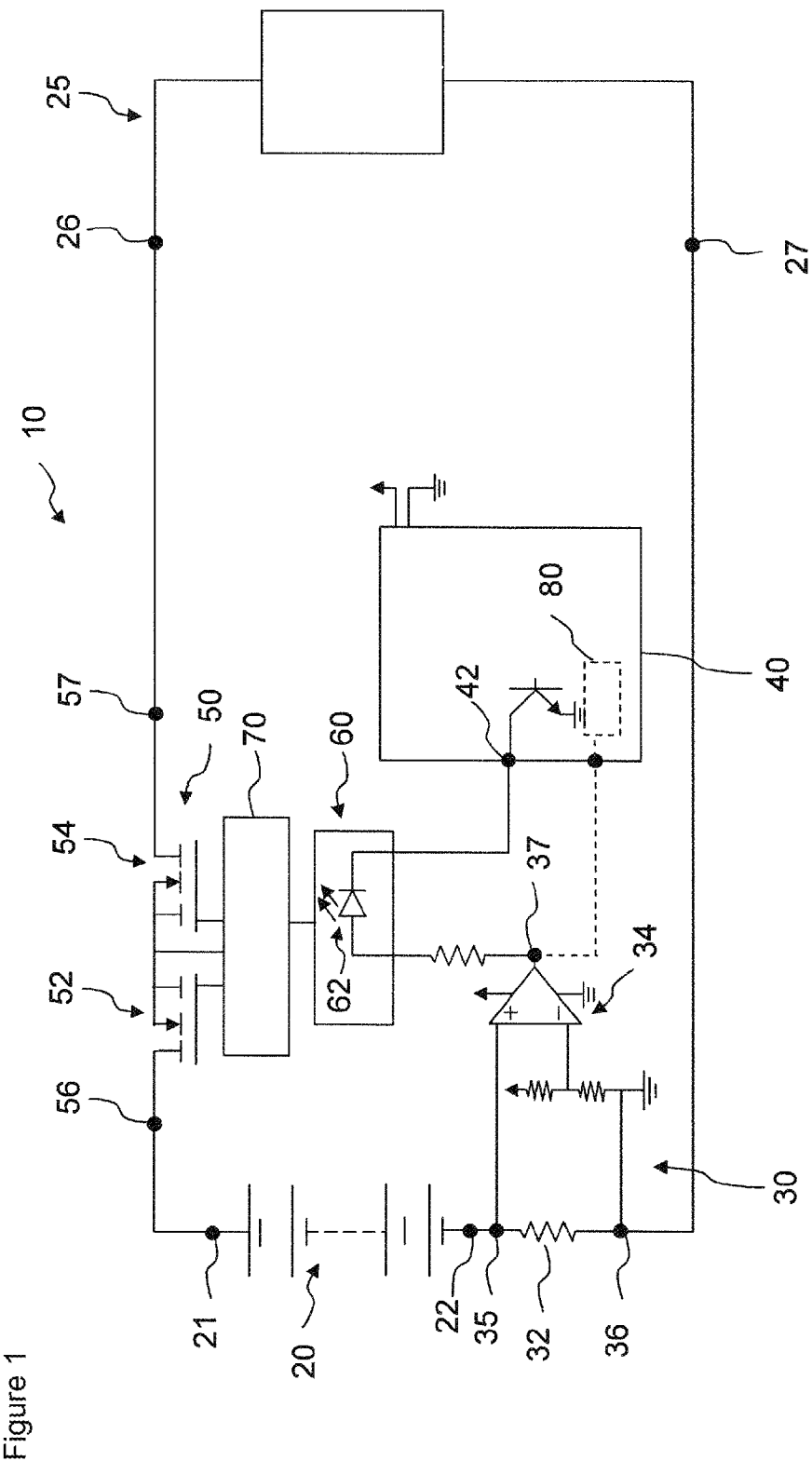
FIG. 1 is a schematic block diagram for an exemplary energy storage system.

FIG. 1 illustrates an energy storage system 10 that is electrically coupled to an energy network 25 of an electric and/or hybrid vehicle. The electric and/or hybrid vehicle is, for example, a motorcycle.

The energy storage system 10 includes an energy store (accumulator) 20. The energy store 20 is, for example, designed to be a high-voltage battery for an electric and/or hybrid vehicle. The battery comprises a plurality of battery cells. The battery cells may be designed, for example, as lithium ion cells. The battery cells need not only be in series, as is illustrated in FIG. 1, but may instead also be connected in parallel to one another, or may be a combination of the two.

The energy storage system 10 has a circuit arrangement for operating the energy store 20.

The circuit arrangement includes an analog monitoring circuit 30, which is designed and arranged to detect a measurement signal that is representative of a current flowing through the energy store 20, and to generate a predetermined first control signal in a manner dependent on the measurement signal. The analog monitoring circuit 30 includes, for example, a current sensor, e.g., a measuring resistor 32, and an analog comparator 34. The analog comparator 34 is designed and arranged in order to generate the first control signal in a manner dependent on a comparison of a predetermined threshold value with a voltage drop at the measuring resistor 32. The measuring resistor 32 is designed, for example, as a shunt. The current flowing through the shunt causes a voltage drop that is proportional thereto. Alternatively or additionally, the current sensor may be, for example, a Hall sensor.

The comparator 34 includes, for example, an operational amplifier with a predetermined circuit. The comparator preferably reacts much faster than a software algorithm. The comparator 34 has, for example, a response time of 1 µs.

The analog monitoring circuit 30 is arranged in a load path that electrically couples the energy store 20 to the energy network 25. A total current that is delivered to the energy network 25 flows through the load path. The total current here may be positive or negative. The energy store 20 has a first and second pole 21, 22. The energy network has a first terminal 26 and a second terminal 27.

The current sensor is, for example, arranged in order to detect a current that flows from the second pole 22 of the energy store to the second terminal 27 of the energy network. Thus, the measuring resistor 32 is electrically coupled, for example, to a first measurement terminal 35 with the second pole 22 of the energy store 20, and electrically coupled to a second measurement terminal 36 with the second terminal 27 of the energy network 25. The voltage drop at the measuring resistor 32 is detected between the first and second measurement terminals 35, 36. The analog monitoring circuit 30 is thus configured to detect an overcurrent and/or short-circuit current flowing through the energy store. Alternatively or additionally, it is possible for the current sensor to be arranged in order to detect a current flowing from the first pole 21 of the energy store to the first terminal 26 of the energy network. The measuring resistor 32 may therefore alternatively be connected, for example, between the first pole 21 of the energy store and the first terminal 26 of the energy network 25. In particular, the measuring resistor 32 may be electrically coupled, for example, to the first measurement terminal 35 with the first pole 21 of the energy store, and electrically coupled to the second measurement terminal 36 with a first coupling terminal 56 of a semiconductor switching element 50 of the circuit arrangement.

The circuit arrangement includes at least one semiconductor switching element 50, which is configured, in a first switching state, to electrically couple the energy store 20 to an electric energy network 25 of the electric and/or hybrid vehicle, and, in a second switching state, to electrically decouple the energy store 20 from the electric energy network 25, wherein the semiconductor switching element 50 has a control terminal that is coupled by signaling technology to an output 37 of the monitoring circuit 30, and the switching state of the semiconductor switching element 50 is adjustable in a manner dependent on the first control signal.

The semiconductor switching element 50 has a first and second coupling terminal 56, 57. The first coupling terminal 56 is, for example, electrically coupled to the first pole 21 of the energy store 20. The second coupling terminal 57 is, for example, electrically coupled to the first terminal 26 of the energy network 25.

Alternatively, it is possible for the semiconductor switching element 50 or another semiconductor switching element 50 to be arranged so as to directly or indirectly couple the second pole 22 of the energy store 20 to the second terminal 27 of the energy network 25 in a first switching state, and directly or indirectly decouple the second pole 22 of the high-voltage energy store 20 from the second terminal 27 of the energy network 25 in a second switching state. Directly coupling or decoupling here means that additional circuit components, e.g., the measuring resistor 32, can be arranged in series with the semiconductor switching element 50.

The semiconductor switching element 50 includes, for example, at least one first field effect transistor and at least one second field effect transistor, wherein each at least one second field effect transistor is respectively connected in anti-series to the at least one first field effect transistor. Preferably, the semiconductor switching element 50 has a plurality of (for example, six) such back-to-back transistor pairs, which are connected in series. The field effect transistors are, for example, configured as metal oxide semiconductor field effect transistors (MOSFETs), and in particular, as n-channel MOSFETs.

The control terminal includes, for example, a gate driver 70 for adjusting a respective gate voltage of the field effect transistors. The gate driver 70 has, for example, a delay time of up to 100 ns. The circuit arrangement includes, for example, a digital control device 40. The digital control device 40 is designed to generate a predetermined second control signal in a manner dependent on at least one predetermined energy store-related operational quantity, at least one predetermined vehicle-related environmental quantity, at least one predetermined vehicle-related operational quantity and/or at least one predetermined energy network-related operational quantity. The second control signal is output at a predetermined interface that is coupled by signaling technology to the control terminal of the semiconductor switching element 50. The switching state of the semiconductor switching element 50 is adjustable in a manner dependent on the second control signal.

The digital control device 40 includes, for example, a computing unit, e.g., a central processing unit or a microcontroller.

Preferably, the first and second control signals are used to control decoupling and coupling of the energy store 20 with the energy network 25.

Here, a predetermined course of the first control signal is representative of a request for the semiconductor switching element 50 to occupy the second switching state, and a predetermined course of the second control signal is likewise representative of a request for the semiconductor switching element 50 to occupy the second switching state. If the first control signal or the second control signal—or both control signals—has the respective predetermined course, then the control terminal of the semiconductor switching element 50 is controlled such that the semiconductor switching element 50 occupies the second switching state.

Additionally, a predetermined further course of the second control signal is representative of a request for the semiconductor switching element 50 to occupy the first switching state. If the second control signal has the predetermined further course and the first control signal does not have the predetermined course, then the control terminal of the semiconductor switching element 50 is controlled such that the semiconductor switching element 50 occupies the first switching state. This signifies that the energy store and the energy network can be coupled only if there is no detected overcurrent and/or short-circuit current.

The control device 40 thus normally enacts the respective switching state of the semiconductor switching element 50 in the absence of a short-circuit. In the event of an overcurrent and/or short-circuit, the analog monitoring circuit 30 reacts more quickly, and thus enacts the second switching state for the semiconductor switching element 50.

For the control of the control terminal of the semiconductor switching element 50, for example, the output 37 of the analog monitoring circuit 30 and a control signal output of the digital control device 40, at which the second control signal is outputted, are electrically coupled such that the first and second control signals are linked in a predetermined manner.

Optionally, the control device 40 includes a watchdog timer. The watchdog timer may be configured as an additional chip, or as components of the computing unit, e.g., of the processor.

The watchdog timer is configured, for example, so as to cause the control device 40 to generate the second control signal with the predetermined course if the current flowing through the energy store 20 exceeds a predetermined value for a predetermined duration, such that the control terminal of the semiconductor switching element 50 is controlled such that the semiconductor switching element 50 occupies the second switching state.

The circuit arrangement includes, for example, a decoupling circuit module 60 having a galvanic decoupling element, an output, and a first and second input, wherein the output is electrically coupled to the semiconductor switching element 50, and in particular to the gate driver 70. The first input is electrically coupled to the monitoring circuit 30, and the second input is electrically coupled to the control output 42 of the control device 40. The galvanic decoupling element galvanically decouples the output from the first and second inputs and, in a potential-free manner, connects the output and the two inputs. The galvanic decoupling element preferably includes an optical transmission element and an optical receiver element. As the transmission element, the galvanic decoupling element includes, for example, a light-emitting diode 62 that has an anode electrically coupled to the output 37 of the analog monitoring circuit 30 and a cathode electrically coupled to the control output 42 of the control device 40. The light-emitting diode 62 enables the predetermined linking of the first and second control signals.

Figure 2:
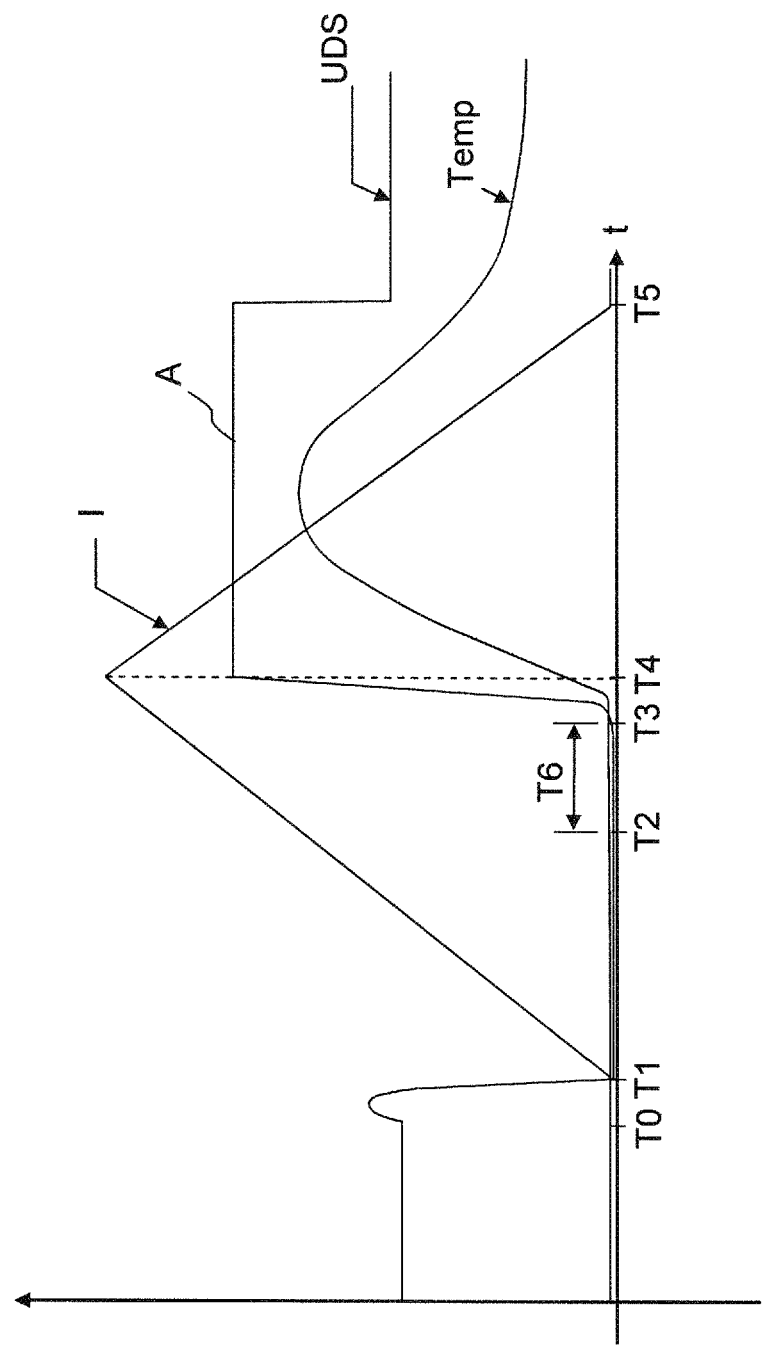
FIG. 2 is a timing diagram for a current, voltage, and temperature variation.

FIG. 2 illustrates an example of a time course of a load current I through the energy network 25, or through the load. FIG. 2 also illustrates an example of a time course of a temperature Temp of a respective blocking field effect transistor chip, as well as a time course of a drain-source voltage UDS of the respective field effect transistor. The courses illustrated in FIG. 2 characterize, in particular, an overcurrent shutdown in the event of a short-circuit.

In the event of a short-circuit, the electrical behavior of the energy network 25 can be characterized with a simplified equivalent circuit diagram having an ohmic resistance and an inductance. The ohmic resistance has, for example, approximately 100 μΩ. The inductance has, for example, a value of approximately 5 μH. The current rises very rapidly in the event of a short-circuit. The current is then practically limited only by the inductance.

The functionality of the circuit arrangement shall now be described in greater detail.

At a time T0, the second control signal is generated by the control device 40 in accordance with the predetermined further course, so that the semiconductor switching element 50 is transferred to the first switching state. At a time T1, for example, 5 μs after T0, the field effect transistors conduct. The load current I through the energy network 25 rises linearly or at least approximately linearly due to the inductance, which is substantially representatively of energy network-related line inductances. At a time T2, for example, 26 μs after T1, the load current I flowing through the energy network 25 achieves a value of 250 A. This value is identical to the predetermined threshold value of the analog monitoring circuit 30 in the example depicted. At the time T2, therefore, the analog monitoring circuit 30 detects that the load current I exceeds the predetermined trigger level. After a response time T6, of, for example, 8 μs, or at a time T3, the shutdown of the field effect transistors begins. The response time T6, includes the response time of the analog monitoring circuit 30 and a signal delay time of the first control signal from the output 37 of the analog monitoring circuit 30 to the control terminal.

During this response time T6, the load current I rises at least approximately linearly. The threshold value is preferably predetermined such that despite the further current rise during the response time T6, the load current I remains below a predetermined maximum allowable energy store current. The predetermined maximum allowable energy store current is, for example, 320 A.

At the time T3, the gate driver 70 begins shutting down the field effect transistors. At a time T4, e.g., 5 μs after T3, the field effect transistors are completely turned off.

However, due to the inductance, the load current I continues flowing, and the respective blocking field effect transistors merge into an avalanche operation A. In the avalanche operation A, a very large amount of thermal energy is generated in the respective blocking field effect transistors. This causes the silicon temperature of the respective blocking field effect transistor to rise rapidly. Subsequently, the temperature Temp decreases again due to the dropping load current I. If the temperature Temp of the silicon rises by a maximum of 100 K ($\Delta T=100$ K), the silicon reaches a maximum of 160° C. at an ambient temperature of 60° C. At a maximum allowable operating temperature of 175° C. for the field effect transistors, the semiconductor switching element 50 is still sufficiently reliably operational.

LIST OF REFERENCE SIGNS

10: energy storage system
20: energy store
21: first pole
22: second pole
25: energy network
26: first terminal
27: second terminal
30: analog monitoring circuit
32: measuring resistor
34: analog comparator
35: first measurement terminal
36: second measurement terminal
37: output
40: digital control device
42: control output
50: semiconductor switching element
52: first field effect transistor
54: second field effect transistor
56: first coupling terminal
57: second coupling terminal
60: decoupling circuit module
62: light-emitting diode
70: gate driver
80: watchdog timer
A: avalanche operation
I: load current
T0 . . . T5: points in time
T6: duration
Temp: temperature of the field effect transistor chip
UDS: drain-source voltage of the field effect transistor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for operating an energy store of an electric and/or hybrid vehicle, the circuit arrangement comprising:
- an analog monitoring circuit designed and arranged to detect a measurement signal that is representative of a current flowing through the energy store, and to generate a predetermined first control signal in a manner dependent on the measurement signal;
- at least one semiconductor switching element, which is configured, in a first switching state, to electrically couple the energy store to an electric energy network of the electric and/or hybrid vehicle, and, in a second switching state, to electrically decouple the energy store from the electric energy network, wherein the semiconductor switching element comprises a control terminal that is coupled to an output of the monitoring circuit; and
- a digital control device designed to generate a predetermined second control signal, wherein the digital control device is coupled to the control terminal of the semiconductor switching element, and
- wherein the switching state of the semiconductor switching element is adjustable in a manner dependent on the first control signal and the second control signal.

2. The circuit arrangement according to claim 1, wherein the digital control device is designed to generate the predetermined second control signal in a manner dependent on: (i) at least one predetermined energy store-related operational quantity, (ii) at least one predetermined vehicle-related environmental quantity, (iii) at least one predetermined vehicle-related operational quantity, and/or (iv) at least one predetermined energy network-related operational quantity, wherein
the second control signal is output at a predetermined interface coupled to the control terminal of the semiconductor switching element, so that the switching state of the semiconductor switching element is adjustable in a manner dependent on the second control signal.

3. The circuit arrangement according to claim 2, wherein:
- a predetermined course of the first control signal is representative of a request for the semiconductor switching element to occupy the second switching state;
- a predetermined course of the second control signal is representative of a request for the semiconductor switching element to occupy the second switching state; and
- if the first control signal and/or the second control signal has the respective predetermined course, then the control terminal of the semiconductor switching element is controlled such that the semiconductor switching element occupies the second switching state.

4. The circuit arrangement according to claim 3, wherein:
- a predetermined further course of the second control signal is representative of a request for the semiconductor switching element to occupy the first switching state; and
- if the second control signal has the predetermined further course and the first control signal does not have the predetermined course, then the control terminal of the semiconductor switching element is controlled such that the semiconductor switching element occupies the first switching state.

5. The circuit arrangement according to claim 4, wherein the semiconductor switching element comprises at least one field effect transistor.

6. The circuit arrangement according to claim 5, wherein:
- the semiconductor switching element comprises at least one first field effect transistor and at least one second field effect transistor, and
- each at least one second field effect transistor is respectively connected in anti-series to the at least one first field effect transistor.

7. The circuit arrangement according to claim 6, further comprising:
- a decoupling circuit module having a galvanic decoupling element, an output, and at least one input, wherein
- the output is electrically coupled to the semiconductor switching element,
- the input is electrically coupled to the monitoring circuit and/or to the control device, in order receive the first control signal or the second control signal, and
- the galvanic decoupling element galvanically decouples the output and the at least one input and, in a potential-free manner, connects the output and the at least one input.

8. The circuit arrangement according to claim 7, wherein the galvanic decoupling element comprises an optical transmission element and an optical receiver element.

9. The circuit arrangement according to claim 2, wherein:
- the analog monitoring circuit comprises a current sensor and an analog comparator, and
- the analog comparator is designed and arranged so as to generate the first control signal in a manner dependent on a comparison of a predetermined threshold value with a measurement value that is detected by the current sensor and is representative of a current that flows through the energy store.

10. The circuit arrangement according to claim 1, wherein the semiconductor switching element comprises at least one field effect transistor.

11. The circuit arrangement according to claim 1, wherein:
- the semiconductor switching element comprises at least one first field effect transistor and at least one second field effect transistor, and
- each at least one second field effect transistor is respectively connected in anti-series to the at least one first field effect transistor.

12. The circuit arrangement according to claim 1, further comprising:
- a decoupling circuit module having a galvanic decoupling element, an output, and at least one input, wherein
- the output is electrically coupled to the semiconductor switching element,
- the input is electrically coupled to the monitoring circuit and/or to the control device, in order receive the first control signal or the second control signal, and
- the galvanic decoupling element galvanically decouples the output and the at least one input and, in a potential-free manner, connects the output and the at least one input.

13. The circuit arrangement according to claim 12, wherein the galvanic decoupling element comprises an optical transmission element and an optical receiver element.

14. The circuit arrangement according to claim 1, wherein:
- the analog monitoring circuit comprises a current sensor and an analog comparator, and the analog comparator is designed and arranged so as to generate the first control signal in a manner dependent on a comparison of a predetermined threshold value with a measurement value that is detected by the current sensor and is representative of a current that flows through the energy store.

15. An energy storage system for an electric and/or hybrid vehicle, comprising:
an energy store; and
a circuit arrangement for operating the energy store, the circuit arrangement comprising:
an analog monitoring circuit designed and arranged to detect a measurement signal that is representative of a current flowing through the energy store, and to generate a predetermined first control signal in a manner dependent on the measurement signal;
at least one semiconductor switching element, which is configured, in a first switching state, to electrically couple the energy store to an electric energy network of the electric and/or hybrid vehicle, and, in a second switching state, to electrically decouple the energy store from the electric energy network, wherein the semiconductor switching element comprises a control terminal that is coupled to an output of the monitoring circuit; and
a digital control device designed to generate a predetermined second control signal, wherein the digital control device is coupled to the control terminal of the semiconductor switching element, and
wherein the switching state of the semiconductor switching element is adjustable in a manner dependent on the first control signal and the second control signal.

16. The energy storage system according to claim 15, wherein the digital control device is designed to generate the predetermined second control signal in a manner dependent on: (i) at least one predetermined energy store-related operational quantity, (ii) at least one predetermined vehicle-related environmental quantity, (iii) at least one predetermined vehicle-related operational quantity, and/or (iv) at least one predetermined energy network-related operational quantity, wherein
the second control signal is output at a predetermined interface coupled to the control terminal of the semiconductor switching element, so that the switching state of the semiconductor switching element is adjustable in a manner dependent on the second control signal.

17. The energy storage system according to claim 16, wherein:
a predetermined course of the first control signal is representative of a request for the semiconductor switching element to occupy the second switching state;
a predetermined course of the second control signal is representative of a request for the semiconductor switching element to occupy the second switching state; and
if the first control signal and/or the second control signal has the respective predetermined course, then the control terminal of the semiconductor switching element is controlled such that the semiconductor switching element occupies the second switching state.

18. The energy storage system according to claim 17, wherein:
a predetermined further course of the second control signal is representative of a request for the semiconductor switching element to occupy the first switching state; and
if the second control signal has the predetermined further course and the first control signal does not have the predetermined course, then the control terminal of the semiconductor switching element is controlled such that the semiconductor switching element occupies the first switching state.

19. The energy storage system according to claim 15, wherein the semiconductor switching element comprises at least one field effect transistor.

20. The energy storage system according to claim 15, wherein:
the semiconductor switching element comprises at least one first field effect transistor and at least one second field effect transistor, and
each at least one second field effect transistor is respectively connected in anti-series to the at least one first field effect transistor.

* * * * *